United States Patent [19]

Kraus et al.

[11] 4,346,491

[45] Aug. 31, 1982

[54] THREAD REPAIR TOOL

[75] Inventors: Roger B. Kraus, Castro Valley; Rudy Pretti, San Leandro, both of Calif.

[73] Assignee: Rethread, Inc., Castro Valley, Calif.

[21] Appl. No.: 93,289

[22] Filed: Nov. 13, 1979

[51] Int. Cl.³ .............................................. B23G 7/02
[52] U.S. Cl. .................................... 10/111; 10/123 S
[58] Field of Search ................ 10/101 R, 101 P, 111, 10/110, 121, 123 S; 408/207, 231, 232, 15 G

[56] References Cited

U.S. PATENT DOCUMENTS

| | | | |
|---|---|---|---|
| 1,522,443 | 1/1925 | Griffin et al. | 408/156 |
| 3,956,787 | 5/1976 | Crumpacker | 10/121 X |
| 4,095,917 | 6/1978 | Wesner | 10/123 S X |

FOREIGN PATENT DOCUMENTS

| | | | |
|---|---|---|---|
| 281033 | 2/1914 | Fed. Rep. of Germany | 10/111 |
| 13050 | of 1893 | United Kingdom | 10/111 |
| 558580 | 1/1944 | United Kingdom | 10/121 |

*Primary Examiner*—Eugene F. Desmond
*Attorney, Agent, or Firm*—Manfred M. Warren; Robert B. Chickering; Glen R. Grunewald

[57] ABSTRACT

The invention, in its preferred form, involves a pair of complementary substantially half-nut sections adapted to be manually assembled about a stud having a damaged thread to be repaired, the side walls of the half-nut sections being substantially arcuate to form a cylinder when assembled, to receive a socket adapted at one end to snugly slide over the assembled nut sections to retain them in their assembled positions. To preclude relative rotation between the socket and the assembled nut sections, one or both half-nut sections is provided with a planar slope intersecting the proximate arcuate outer surface, which planar slope is adapted to be engaged by a pin passing through the socket along a cord thereof, when the socket is slipped over the assembly nut sections. Upon application of pressure and a simultaneous turning force to the socket, either clockwise or counter-clockwise in accordance with desired direction of travel, while being clamped against the same, in the course of which, the assembled nut-sections will repair the damaged thread or threads. The threads are preferably so designed as to essentially reform or mold the material of the damaged threads back into the original thread shape, as distinguished from cutting a new thread, as is the practice in the prior art.

13 Claims, 9 Drawing Figures

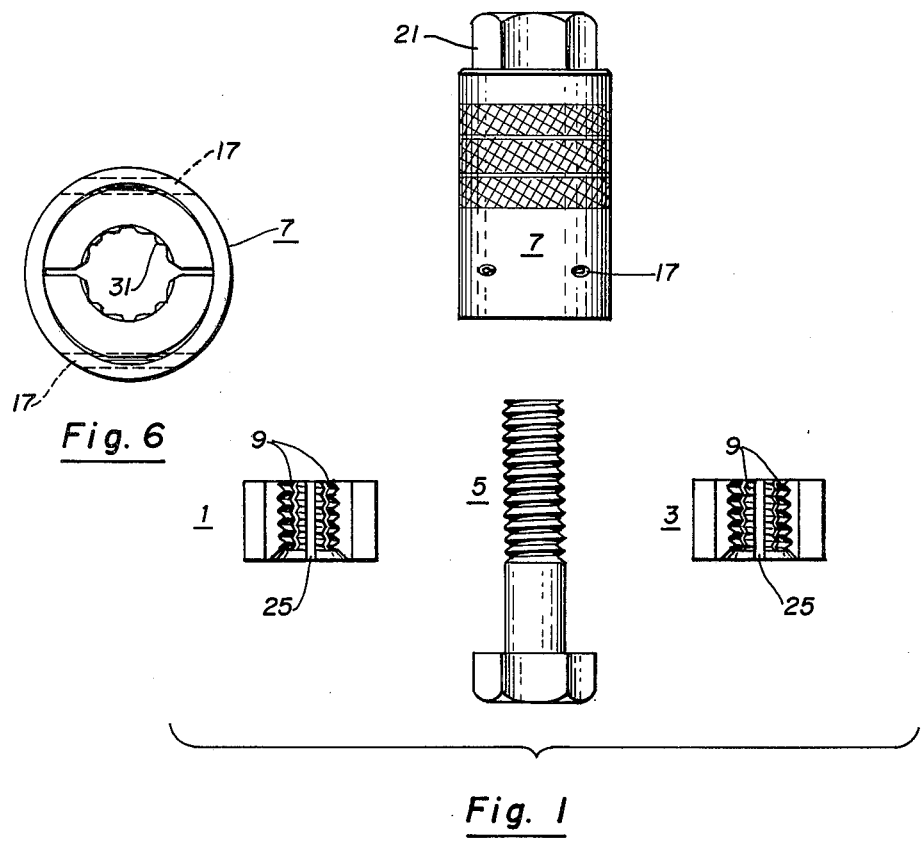
Fig. 6
Fig. 1
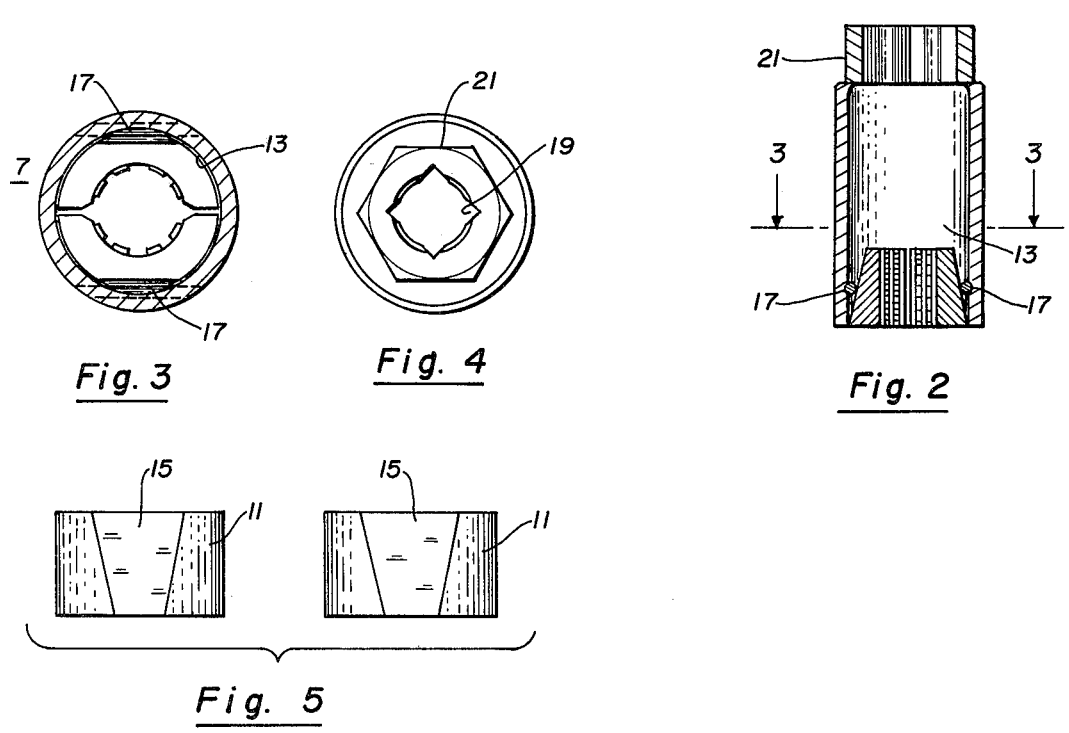
Fig. 3
Fig. 4
Fig. 2
Fig. 5

THREAD REPAIR TOOL

THE INVENTION

The invention relates to the repair of damaged threads on studs, bolts or similar threaded elements, and more particularly, to a tool assembly for performing such repair.

While the invention is basically applicable to the repair of damaged threads on studs, bolts . . . etc. of all sizes, it is particularly directed to the repair of damaged threads on studs, bolts and the like of substantial length.

In servicing and repairing of apparatus or equipment involving studs, bolts or the like for bolting parts together, the terminal or end threads are usually susceptible to damage. One prevalent example of such involves the removal of heavy truck wheels to fix and repair tires. Such wheels are mounted on studs and, in removing the wheels, the threads and in particular, the end threads are susceptible to being damaged. Such studs are of substantial length and are not capable of being repaired by available tools designed for the shorter studs, such as are to be found on passenger cars.

Among the objects of our invention are:
(1) To provide a novel and improved means for repairing damaged threads on studs, bolts or the like;
(2) To provide a tool assembly that is capable of use in repairing damaged threads on long studs, bolts or the like; and
(3) To provide novel and improved means for repairing damaged threads on studs, bolts or the like, by essentially reforming or molding the material of the damaged threads back into the original thread shape.

Additional objects of our invention will be brought out in the following description of preferred embodiments of the same, taken in conjunction with the accompanying drawings wherein;

FIG. 1 is an exploded view, of a preferred form of the invention as applied to the repair of a long stud or bolt;

FIG. 2 is a longitudinal view in section, taken through the socket of FIG. 1, with reforming or molding die components assembled therein;

FIG. 3 is a view in section taken in the plane 3—3 of FIG. 2;

FIG. 4 is a plan view of the base end of the socket of FIG. 2;

FIG. 5 is a view in elevation of the outer or side wall surface of both half-nut sections of the reforming or molding die depicted in FIGS. 1, 2 and 3, when each of the half-nut sections is provided with a planar slope;

FIG. 6 is an enlarged view depicting a modification of FIG. 3;

FIG. 8 is a view depicting a reforming or molding die of the present invention, modified to accommodate a standard socket wrench and employable in repairing damaged threads on short studs or the like;

Figure 7:
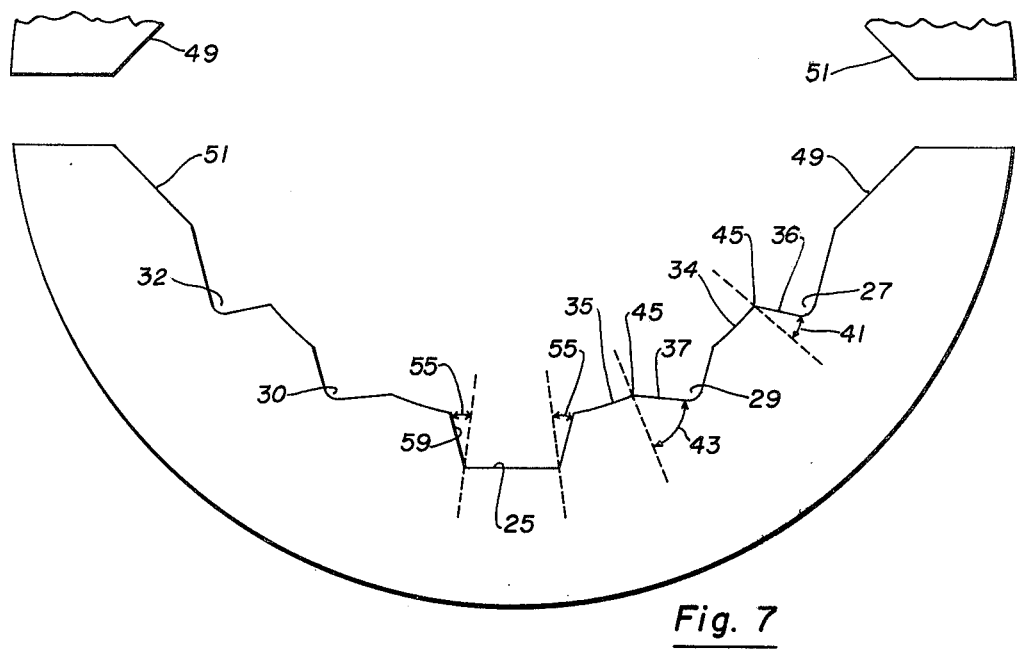
FIG. 7 is a view depicting features of the thread design in the reforming or molding die components involved in the present invention.

Referring to the drawings for details of the invention in its preferred form, the same involves a pair of complementary substantially half-nut sections 1, 3 adapted to be assembled about a threaded element 5 to be treated for a damaged thread, and when so assembled, maintained in such assembled relationship by a socket 7 adapted to slide over the assembled half-nut sections.

The socket and the assembled half-nut sections are interlocked to preclude relative rotation between them and the means so provided to preclude relative rotation, is responsive to application of a downward applied force to clamp the half-nut sections into pressure engagement with the element to be treated. When such downward pressure is applied simultaneously with rotation of the socket, the assembled half-nut sections will unthread as a unit along the element to be treated, in the course of which any damaged threads will be repaired.

Each substantially half-nut section has internal threads 9 complementary to the corresponding threads of the other half-nut section, so that, when the two half-nut sections are assembled, the threads will form a spiral. Each nut section is slightly less than a half circle to enable pressure engagement with the stud about which they may be assembled. With the outer side wall surface 11 of the sections, semi-cylindrical, the assembled sections form a cylindrical outer surface adapted to be enclosed by the socket which has an internal substantially cylindrical wall 123 of accommodating diameter to retain the nut sections in their assembled relationship about the element to be treated.

To preclude relative rotation between the socket and the assembled nut sections, one or both of the nut sections is provided with a planar slope 15 intercepting the proximate arcuate side wall surface along the mid portion thereof while the socket is provided with a pin 17 along each of diametrically disposed chords and adapted to engage the planar slopes as the socket is assembled over the nut sections.

The base end of the socket is provided with a central hole or opening 19 large enough to freely pass the end of a stud or bolt to be treated, when such stud or bolt is of sufficient length to pass through the base end of the socket when the nut sections are assembled about the stud or bolt to be treated.

To facilitate turning of the socket when thus assembled about the element to be treated, the base end portion is formed into a polygon, such as a hexagon 21, to enable application of a wrench thereto. By applying pressure to the socket as such wrench is being rotated in the direction to unscrew the assembled nut sections along the element being treated, the nut sections will be maintained in clamping relationship to the element being treated as they are being unthreaded along such element, whereby any damaged threads in the path of rotation of the nut sections, will be repaired.

Such use of the polygonal shaped end of the socket leaves the end opening 19 clear for free passage of the stud or bolt, if of sufficient length to protrude. The opening 19 may be polygonal in shape to receive an end of a speed handle for rotating the socket and included nut sections, should the stud—etc. be sufficiently short as not to extend into said opening.

An additional feature of the present invention resides in slightly compressing the socket at the die receiving end, as depicted in FIG. 6, to form a cross-section slightly oval in shape with the chord pins 17 intersecting the maximum diameter. Along the short diameter, the socket will possess a certain amount of give. This enables a snug or tight fit of the socket to the nut sections at the ends of the short diameter, while the chord pins, when under pressure, will effect a corresponding fit against the slopes of the nut sections, thus assuring a tight grasp of the nut sections by the socket when in use, and thereby avoiding wobbling of the socket, which otherwise occurs when the socket presents a loose cylindrical entrance to the assembled nut sections. Such wobbling necessitates added pressure to the socket, when in use, to retain the nut sections in proper pressure engagement with the stud while turning them to effect a repair of threads. The oval shaping of the socket greatly reduces the pressure otherwise required.

The threads of the nut sections may be formed in accordance with prior art practice, as cutting threads, that is with the advance or lead turn terminating in an edge normal to the arc of the stud or bolt being treated, whereby to cut into the material of the damaged thread as the asembled nut sections advance to form a spiral trough through the damaged thread portion to permit application of a nut.

It has been found, that threads when severely damaged, become so distorted out of shape that in cutting a spiral trough to enable application of a nut, quite frequently, the resulting thread may be seriously deficient in material and may, in parts, be thinner, irregular in surface contour and deficient in height. A nut, when applied thereto, will fit loosely and is apt to wobble, in the course of which, it may go off course and starch cutting a new thread of its own, ultimately mutilating the original portion of the thread which was previously undamaged.

We have overcome this problem in a very simple but unobvious manner by cutting cross the threads of each nut section, with a central flute 25, one or more angularly walled flutes 27, 29—etc. to one side of the central flute, and a corresponding number of angularly walled flutes 31 and 33—etc. to the other side of the central flute, with the angularly walled flutes to one side of the central flute preferably being a mirror image of the others.

Considering that portion of each nut section having the flutes 27 and 29 in conjunction with the central flute 25, such portion is adapted for use in the repairing of damaged right hand threads when rotated counterclockwise and, considered with this mind, the flutes 27 and 29 create a plurality of thread segments 34, 35 each having an advance or lead edge 36 and 37 respectfively, forming a lead angle 41 and 43 respectively with the normal to the stud or bolt to be worked on, with the free corner 45 of each lead edge, trailing and reaching to the bottom of the desired trough between the threads of the stud or bolt being worked on.

Thus, little cutting action can occur. What happens in lieu thereof, is that the sloping advance edge of each thread segment functions for the most part, to pressure the material of the damaged threads which might be in its path, causing excess material to spread into the proximate troughs of the nut sections to thereby reform or mold the material of the damaged threads into new threads. The nut sections, therefore, become portions of a reforming or molding die, as distinguish from the thread cutting means of the prior art. Any cutting action will decrease with increase in the lead angle of the advance or lead edge of a thread segment and will be restricted for the most part, to the trough of the thread being reformed.

The difference in results over the conventional cutting die thread, lies in the fact that by reforming or molding the material of the damaged threads, a minimal amount of the thread material will be removed. The greater portion is reused in reforming or molding the new thread. The resulting thread approaches the original thread more closely to what it was prior to its being damaged, and thus a nut, when applied to the thread as thus reformed, will not wobble and introduce a risk of cutting into the original thread further down the stud or bolt.

The lead angles 41, 43—etc. are not critical, nor are they necessarily the same. We have found after prolonged periods of experimentation, that less effort and cleaner results may be realized by not only assuming lead angles of intermediate values, but by utilizing successive leads angles of different values. Thus, in the preferred embodiment as illustrated in FIG. 7 of the drawings, the initial lead angle formed by the flute 27, will be of the order of 35 degrees, whereas the lead angle formed by the flute 29 will be of the order of 60 degrees. In relationship to the die thread segments, the lead edge 36 makes an angle of the order of 125 degrees with the segment 34, while the lead edge 37 makes an angle of the order of 150 degrees with the segment 35.

We have further found as a result of our prolonged experimentation, that additional improved results, both in minimizing turning effort required in the process of repairing damaged threads and in precision of the ultimate results, can be realized by (1) bevelling the inside corners of each nut section to intercept the proximate wall of the flutes 27 and 33 respectively, whereby to create very shallow lead edges 49 and 51, each of which terminates short of the thread trough of the stud or bolt being repaired, and (2) by forming the central trough 25 with outwardly sloping side walls, each forming an angle 55 of the order of only 5 degrees with the normal.

The shallow leading edge 49 formed by bevelling the proximate inside corners of the nut section, functions to partially depress material in its path before the lead edge 35 reaches such material, thereby relieving the lead edge 35 of this burden and thereby reducing turning force which might otherwise be required.

A lead edge 59 formed by the central flute 25, being at a quite small angle with the normal, such edge when functioning as a lead edge, will effect a certain degree of cutting in the trough of the threads being formed by the lead edges 49, 36 and 37 immediately preceeding the center trough, and thus effect a cleanup action and a preferred shaping of the trough of the reformed thread.

In each nut section, therefore, it will be appreciated, a mirror image of what appears to one side of the center flute, will also prevail to the other side.

In employing the complementary nut sections for the intended purpose of repairing a damaged thread or threads on a stud or the like, the nut sections are manually assembled to that portion of the stud or the like on which the threads are not damaged, and this will inevitably be that portion removed from the free end of the stud. Following such assembly, the socket is applied over the resulting reforming or molding die and the die is then rotated in a counter clockwise direction for a right hand thread stud to unthread the die along the stud where, upon reaching the damaged threads, the die will begin to reform the damaged threads while being guided by the good threads of the stud to which the die sections have been initially assembled.

Upon withdrawal of the die to the point of fully traversing the damaged thread portion, and without completely withdrawing the die from the stud, the die may then be threaded back toward its starting point, in the course of which, the mirror image portion of each nut section can serve to remove any particles remaining in the reformed thread portion of the stud. The flutes provide space for accumulating any such excess material which is thus removed from the threads of the stud, as well as any material previously present during the reforming process.

Figure 9:
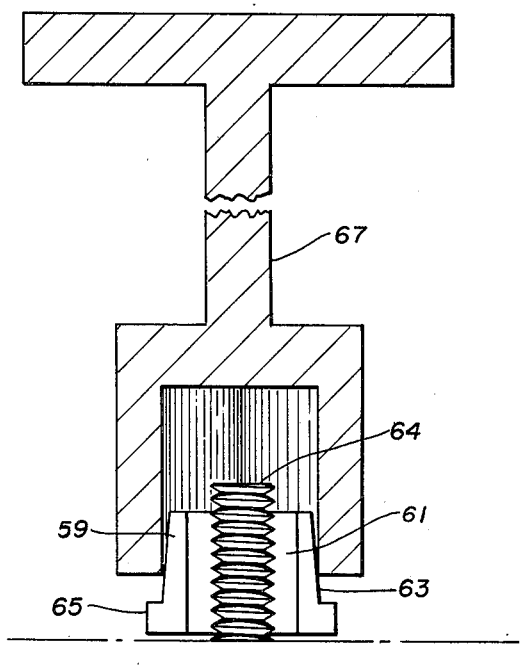
FIG. 9 is a view in section illustrating use of the die of FIG. 8 with a conventional type socket wrench.
Figure 8:
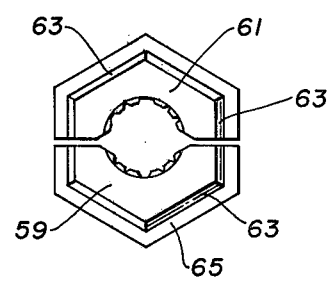

In FIGS. 8 and 9 of the drawings, we have illustrated a manner of adapting the aforementioned thread features to a thread repair tool adapted for use in reforming damaged threads on studs, bolts or the like of short length.

The nut sections 59, 61, like in the prior embodiment of the invention, are two in number, but differ in that each of the nut sections has sloping outer side wall surfaces 63 which, when the two nut sections are assembled about a stud 64, for example, they form a trunctated pyramid, and, preferably, one with a base 65 added. The nut sections are such that, when assembled about a threaded stud or bolt, will not contact each other, but a slight space will exist between them, thus allowing for application of pressure radially against the nut sections to cause them to pressure engage the threaded stud or bolt whose damaged threads are to be reformed.

When thus assembled about such stud—etc., the application of a properly sized socket wrench 67, will engage the sloping sides of the resulting die and, upon simultaneous application of pressure and turning moment to the die, the die can be unthreaded over the damaged thread portion, while the die sections are maintained in pressure engagement with the stud or the like, to reform threads from the damaged thread material. As in the previous embodiment, the die may be threaded back down the stud to effect any cleanup that may be necessary.

From the foregoing description of our invention in its preferred form, it will be apparent that the same may be altered or modified without departing from the underlying principles involved, and we, accordingly, do not desire to be limited in our protection to the specific details so illustrated and described, except as may be necessitated by the appended claims.

We claim:

1. A thread repair tool for repairing damaged threads on a stud or the like, comprising: a plurality of disconnected nut sections having complementary inside threads defining a spiral thread when the sections are assembled about a stud having a like number of threads per inch, and outer surfaces forming an outer side wall surface when so assembled; a socket having an open end shaped to slide axially over said nut sections when the sections are assembled about a stud; and means engaged between the socket and nut sections upon application of said socket to said assembled nut sections for precluding relative rotation of said socket with respect to said assembled nut sections, and means enabling simultaneous application of pressure and turning force to said socket to clamp said assembled nut sections to such stud while rotating said assembled nut sections as a unit along such stud.

2. A thread repair tool in accordance with claim 1, characterized by said means for precluding relative rotation of said socket with respect to said assembled nut sections, including a planar slope intersecting the arcuate outer surface of at least one of said nut sections, and a pin through said socket along a chord thereof and adapted to engage said planar slope when said socket is slid over such assembly of nut sections.

3. A thread repair tool in accordance with claim 1, characterized by said means for enabling application of a turning force to said socket after application of said socket to said assembly of nut sections including diametrically located flat surfaces on said socket for application of a wrench to effect turning while leaving said end opening available for passage of long studs or the like being treated.

4. A thread repair tool in accordance with claim 1, characterized by a planar slope intersecting the arcuate outer surface of each of said nut sections, and a pair of pins, each extending through said socket along a chord thereof and adapted to engage a different one of said planar slopes when said socket is slid over such assembly of nut sections.

5. A thread repair tool in accordance with claim 3, characterized by said diametrically located flat surfaces being provided by a hex end on said socket.

6. A thread repair tool in accordance with claim 1, characterized by each of said nut sections having thread segments, each of said thread segments having a leading or advancing edge forming a lead angle with the normal to the stud or bolt to be treated, whereby to pressure such damaged thread material as lies in its path of travel, to reform such material into threads.

7. A thread repair tool for repairing damaged threads in a stud or the like comprising a plurality of nut sections having complementary inside threads adapted to form a spiral thread when assembled about a stud having a like number of threads per inch, and substantially arcuate outer surfaces to form a substantially cylindrical outer side wall surface when so assembled, a socket adapted at one end to slide over said nut sections when so assembled about a stud, means upon application of said socket to said assembled nut sections for precluding relative rotation of said socket with respect to said assembled nut sections, said means comprising a planar slope on at least one of said nut sections and intersecting the arcuate outer surface of said nut section, and a pin through said socket along a chord thereof and adapted to engage said planar slope upon sliding said socket over said nut sections when assembled about a stud or the like, and means enabling simultaneous application of pressure and turning force to said socket to clamp said assembled nut sections to such stud while rotating said assembled nut sections as a unit in the direction of withdrawal along such stud.

8. A thread repair tool in accordance with claim 7, characterized by each of said nut sections having thread segments, ach segment having a leading or advancing edge forming a lead angle with the normal to the stud or bolt to be treated, whereby to pressure such damaged thread material as lies in its path of travel, to reform such material into threads.

9. A thread repair tool, comprising:
a plurality of threaded nut sections having complementary threads forming a spiral thread when assembled about a stud or bolt to be worked on, the threads of each nut section presenting an advancing or lead edge at a predetermined angle with the normal to a stud or the like to be treated, and with the free end of said lead edge trailing, such that when said nut sections are assembled about a stud or the like to be treated, and then rotated, said lead edges apply a compressive thread reforming pressure to damaged thread material in its path to reshape damaged threads.

10. A thread repair tool in accordance with claim 9, characterized by each of said nut sections having a central flute cutting through the threads thereof and at least one angular wall flute to either side of said central flute, with one of said flutes being the mirror image of the other, whereby said threads will be cut into segments with the segments to one side of said central flute having an angular lead edge in one direction of rotation while those segments to the other side of said central flute will have an angular lead edge in the opposite direction of rotation.

11. A thread repair tool in accordance with claim 10, characterized by a pair of flutes to either side of said central flute to form a pair of thread segments to either side of said central flute, that segment farthest from said central flute having a lead edge forming an angle with the normal to a stud or the like to be treated, of the order of thrity-five degrees while that segment closer to the central flute, having a lead edge forming an angle with such normal, of the order of sixty degrees.

12. A thread repair tool in accordance with claim 11, characterized by said central flute having walls each forming an angle with such normal, of the order of five degrees.

13. A thread repair tool in accordance with claim 1, wherein the nut sections have substantially arcuate outer surfaces to form a substantially cylindrical outer surface when the nut sections are assembled about a stud to be repaired.

* * * * *

UNITED STATES PATENT AND TRADEMARK OFFICE
CERTIFICATE OF CORRECTION

PATENT NO. : 4,346,491
DATED : August 31, 1982
INVENTOR(S) : Kraus et al.

It is certified that error appears in the above-identified patent and that said Letters Patent are hereby corrected as shown below:

column 6 line 48, delete "ach" and insert---each--- column 2 line 23, delete "123" and insert---13--- column 3 line 24, delete "starch" and insert---start---

Signed and Sealed this

Seventh Day of December 1982

[SEAL]

Attest:

Attesting Officer

GERALD J. MOSSINGHOFF

Commissioner of Patents and Trademarks